Sept. 27, 1960

N. R. HIBBARD ET AL 2,954,113

CONVEYER CHAIN ATTACHMENTS

Filed Jan. 9, 1957

2 Sheets-Sheet 1

INVENTORS
NELSON R. HIBBARD
BY ANTHONY J. MICHALIK
W. D. O'Connor
ATTORNEY

CONVEYER CHAIN ATTACHMENTS

Filed Jan. 9, 1957

2 Sheets-Sheet 2

INVENTORS
NELSON R. HIBBARD
ANTHONY J. MICHALIK
BY W. D. O'Connor
ATTORNEY 2,954,113

CONVEYER CHAIN ATTACHMENTS

Nelson R. Hibbard, Springfield, Mass., and Anthony J. Michalik, Thompsonville, Conn., assignors to Chain Belt Company, Milwaukee, Wis., a corporation of Wisconsin Filed Jan. 9, 1957, Ser. No. 633,354

8 Claims. (Cl. 198—189)

This invention relates generally to conveyers of the articulated chain type and more particularly to an improved arrangement for securing attachments such as conveyer flights or the like to a power transmitting chain to constitute a conveyer.

In constructing chain conveyers, it has been the usual practice heretofore to mount material-engaging flight attachments on a chain by means of some rigid, more or less permanent, connecting arrangement. By way of example, flight attachments have been formed integrally with chain links or have been secured to them permanently by means of welding or riveting. Other less permanent means for securing flight attachments to chain links have involved the use of bolts or screws or arrangements whereby parts of the attachments are interlocked with parts of the chain link during assembly of the chain. Such previous arrangements have usually required that the chain employed be of special construction to accommodate the particular attachment securing means utilized. Furthermore, these previously used expedients have generally required considerable effort to manufacture and assemble and have involved various difficulties with the result that some conveyers so made have been inordinately expensive.

It is therefore, a general object of the present invention to provide an improved arrangement for securing an attachment to a conveyer chain quickly and positively without the necessity of dismantling the chain or of permanently altering its construction.

Another object of the invention is to provide an improved arrangement for securing attachments to a power transmitting chain of conventional construction to constitute a conveyer.

Another object is to provide an improved conveyer flight attachment having a resilient connecting element that may be deflected to engage the attachment with and secure it on a link of a chain.

Another object is to provide an improved flight attachment of molded plastic material that is adapted to be engaged resiliently with a link of a power transmitting chain to form therewith one element of a conveyer.

Another object is to provide an improved flat top conveyer for transporting articles or the like.

A further object of the invention is to provide an improved flight attachment for a conveyer chain that is shaped to prevent undersirable flexing of the conveyer chain which might otherwise result in objectionable interference between adjacent attachments.

A still further object of the invention is to provide improved connecting means for a flight attachment which operates to secure the attachment to the chain by resilient means while at the same time serving to hold together separable pieces of a chain link.

According to this invention, there is provided an improved flight attachment adapted to be connected readily to an articulated chain of the power transmitting type to constitute a chain conveyer. By the improved arrangement, a chain of well-known type, such as a roller chain for example, running over conventional sprockets may have flight attachments secured to it at predetermined intervals in a manner to be capable of ready removal and convenient re-attachment. The attachments thus secured to the chain may be of any shape or form best adapted to the work at hand and may be of any suitable material. The various versions of improved flight attachments are all characterized by novel connecting arrangements for securing them to the chain, each attachment being provided for this purpose with one or more flexible connecting elements or resilient legs that may be deflected in effecting engagement with a link of the chain. Preferably, the connecting elements present abutments which interlock with cooperating abutments on the chain links by flexing action of the resilient member when the attachment is seated on the link.

As a specific example, the attachments may be of the top plate cross flight type presenting a series of flat tops to provide a conveyer having a substantially continuous surface for supporting articles being conveyed. Attachments of this type are preferably formed of nylon plastic or like material, but may be of steel or other metals. These attachments each have a pair of resilient legs depending from the top plates at each side of the chain and provided with sockets fitting over the projecting ends of the chain link pivot pins in a manner constituting cooperating interlocking abutments. Furthermore, these depending legs serve to retain loose pieces such as side plates on the chain link. For aligning the attachment with the chain link, the resilient legs are provided on their inner surfaces with guide grooves that lead the pin ends to the sockets. The top plate and the depending legs are shaped to provide the required resistance to bending, and stop members are arranged to limit flexing of the chain in a manner to prevent undesirable overlapping of adjacent top plates. With each attachment securely interlocked with a chain link through resilient action of the flexible legs, the attachment moves with its supporting chain link as a unit in articulating. When it is desired to remove an attachment from the chain, unlocking is effected readily by prying the resilient legs outwardly to deflect them sufficiently to permit disengaging the interlocking abutments.

The foregoing and other objects of this invention will become more fully apparent as the following detailed description of an improved chain conveyer constituting an exemplary embodiment thereof is read in conjunction with its representation in the accompanying illustrative drawings, wherein.

Figure 1:
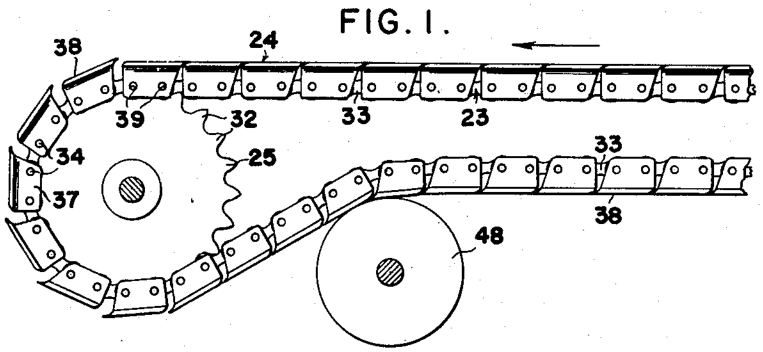
Figure 1 is a view in side elevation of part of a chain conveyer embodying the present invention, showing the manner in which the conveyer articulates about a driving sprocket and a supporting idler roller.

The various conveyers shown in the drawings by way of exemplifying the invention constitute specific examples of apparatus formed by securing attachment flights to chains in accordance with the improved arrangement utilizing flexible connecting elements carried on each of the attachments that is more fully explained in this specification.

Referring now more specifically to the drawings and particularly to Fig. 1 thereof, one form of the improved chain attachments to which the invention is directed is there shown as embodied in a conveyer apparatus comprising essentially a chain 23 of the power transmitting or conveying type made up of conventional articulated links that carry a series of improved flat top material engaging or load carrying flight attachments 24. In accordance with the invention, the improved flight attachments 24 are each provided with resilient connecting elements for connecting them to links of the chain 23, the resilient elements being so arranged that they may be deflected to effect engagement of the attachments with the chain 23 or to remove them from the chain. The chain 23 may be of any desired construction to accord with the circumstances of operation, the particular chain shown by way of illustration being of the well-known roller type adapted to operate over conventional toothed sprockets such as the sprocket 25 that may be power driven to effect operation of the conveyer.

As shown in the enlarged views Figs. 2 to 7, the conventional roller chain 23 there illustrated is constituted by articulated links in the form of interconnected alternately arranged roller links 26 and pin links 27. Each roller link 26 is comprised of a pair of inner side plates or bushing plates 28 that are held in parallel spaced relationship by a pair of transversely disposed hollow bushings 29 the ends of which are pressed into holes 30 formed in the side plates 28 near their respective ends to constitute a rigid unit of generally rectangular shape. Each hollow bushing 29 carries a roller 31 that is rotatably mounted thereon and is fitted between the two side plates 28 in a manner to turn freely on the bushings, the two rollers of each roller link being spaced for rolling engagement with cooperating adjacent teeth 32 of the sprocket 25.

Figure 7:
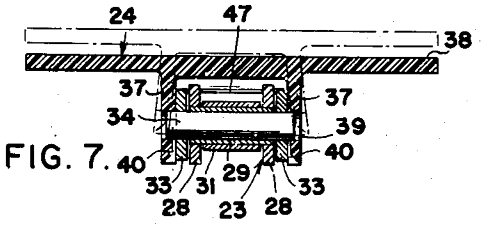
Fig. 7 is a view in transverse section through the chain and through one of the conveyer flight attachments, taken on the plane represented by the line 7—7 in Fig. 4 and showing in broken lines the position assumed by the attachment in being forced into engaging relationship with the protruding ends of the chain pivot pins.

The successive roller links 26 of the chain 23 are interconnected by the interspersed pin links 27, each of which comprises a pair of spaced outer side plates or pin plates 33 that are held in parallel spaced relationship by a pair of transverse pivot pins 34, the ends of which are pressed into holes 35 formed in the pin plates 33 near their respective ends. As best shown in Fig. 7, the ends of the pin plates 33 overlap the bushing plates 28 and the respective pivot pins 34 pass through and are journalled in the hollow bushings 29 of adjacent roller links 26 in a manner to effect pivotal connections therebetween permitting ready articulation of the links of the chain.

In roller chains of this conventional type, it is the usual practice to provide one or perhaps a few special pin links 27 that are made readily detachable in order that the chain may be disconnected easily to remove it from the sprocket 25, for example. Such links are formed with the pins 34 pressed into the holes 35 of only one pin plate 33 while the other pin plate 33 is loosely fitted over the other ends of the pins, as illustrated by the link shown partly detached at the right in Fig. 2. A pin link of this type is called a "connecting link" and the ends of the pins projecting through the loosely fitted pin plate are ordinarily provided with spring clips, cotter pins, or the like, to retain the loose plate on the chain pins.

Figures 2, 3:
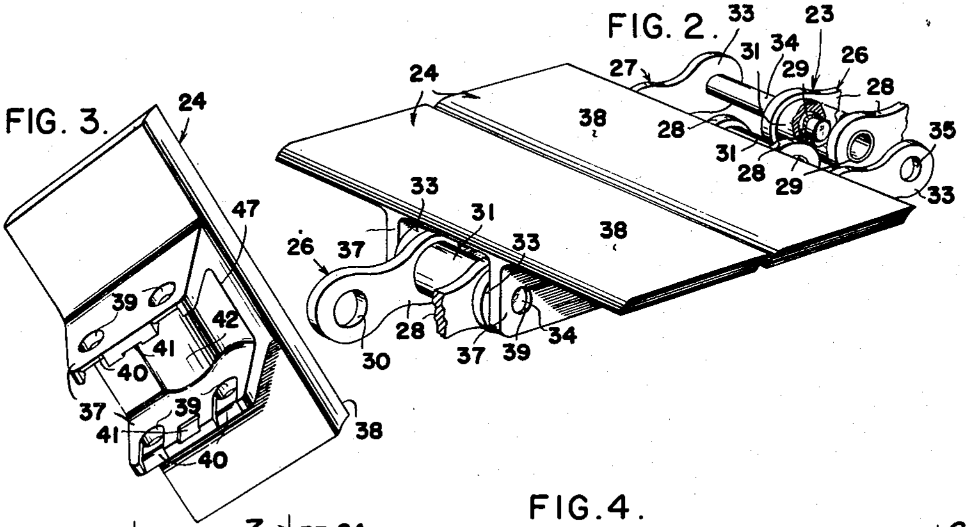
Fig. 2 is an enlarged view in perspective of a partly disconnected fragment of the chain conveyer showing the improved arrangement whereby the cross flight attachments are mounted on the chain links and illustrating the manner in which a chain link may be detached.
Fig. 3 is an enlarged view in perspective of one of the cross flights or top plate attachments showing the depending resilient legs which operate as flexible connecting elements to secure it to a chain link.

As best shown in Figs. 2 and 3 of the drawing, the improved flight attachment 24 is provided with a pair of spaced depending resilient legs 37 that constitute the resilient connecting elements and that are adapted to straddle one of the pin links 27 of the chain 23 in such a manner that they also serve to retain the loose pin plate of a connecting link in position and obviate the necessity for the usual clips or cotter pins that ordinarily are used to retain the connecting links in the chain. Such being the case, it is preferable that the roller chain 23, used in conjunction with the improved attachments 24 to constitute the conveyer, be made up entirely of connecting links interposed between the adjacent roller links in order that the chain may be taken apart at any position throughout its length simply by removing any selected one of the attachments and the corresponding pin link.

Under some circumstances, both pin plates may be loosely fitted on the respective ends of the pins with both the pins and the plates held in position by the resilient action of the flexible depending legs 37 of the flight attachment 24. In this case, the resilient legs 37 are provided with indentations to engage the ends of the pins for retaining them in the chain. In any event, it is preferable that both ends of both pins 34 project outward beyond the respective pin plates far enough to present protruding abutments for engagement by sockets in the legs 37 of the flight attachment 24.

Figure 4:
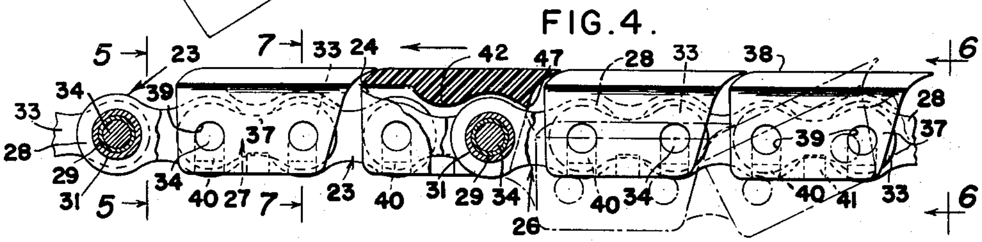
Fig. 4 is an enlarged view in side elevation of part of a conveyer with parts broken away and illustrating in broken lines the manner in which articulation of the chain and the attached cross flights occurs.
Figure 5:
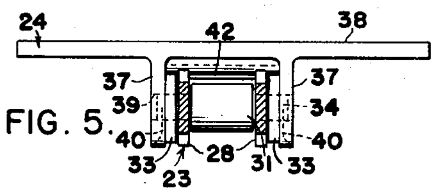
Fig. 5 is a view in transverse section through the conveyer chain taken on the plane represented by the line 5—5 in Fig. 4.
Figure 6:
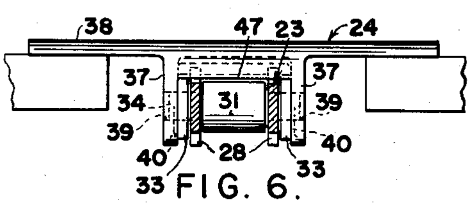
Fig. 6 is another view in transverse section through the conveyer taken on the plane represented by the line 6—6 in Fig. 4 and indicating cooperating rails.

As appears in Figs. 1 to 7 of the drawings, the chain conveyer there shown is of the flat top or plate top type wherein each flight attachment 24 presents a material engaging or load carrying surface in the form of a cross flight or top plate 38 extending transversely of the chain 23 with its ends sliding on guide rails as indicated in Fig. 6. The top plates 38 of successive attachments 24 on the chain 23 are arranged in juxtaposed relationship in a manner to present a substantially flat continuous load receiving surface adapted to support a series of articles, such as containers or the like, being transported by the conveyer.

The previously mentioned, resilient depending legs 37 that constitute the flexible connecting elements, extend outward or downward from the top plate 38 in spaced parallel relationship, and are arranged to straddle the chain 23 in close engagement with the side plates 33 of one of the pin links 27 as shown in Figs. 5, 6 and 7. Each depending flexible leg 37 is provided near its distal end with a pair of sockets or openings in the form of spaced holes 39 disposed to receive the chain abutments constituted by the outwardly protruding ends of the two pivot pins 34 at the respective ends of the pin link 27. Instead of the holes 39 that extend entirely through the legs 37, the sockets may be closed at their outer ends to constitute depressions or identations formed in the inner faces of the legs to receive and retain the projecting ends of the pins. As shown best in Fig. 4, the top plate 38 of each attachment 24 is of sufficient length in the direction of the chain axis to bridge over part of the intervening roller link 26 between the adjacent pin links 27, the arrangement being such that a continuous flat top surface is provided with the attachments 24 secured only to the successive pin links.

The particular improved attachment 24 shown in the drawings is preferably formed of a molded plastic material, nylon materials having been found to have desirable properties for use in conveyers of this type. It is to be understood, of course, that various other plastic materials may be utilized in forming the attachments 24, the selection of material depending upon the service to which it is to be subjected. Furthermore, the attachments may be formed of other than plastic materials to meet other conditions of operation. For example, they may be made of steel or other metals provided that at least one of the connecting elements corresponding to the legs 37 is made sufficiently resilient to permit the necessary deflection required in effecting the connection of the attachment to the chain 23.

As best shown in Fig. 3, the inner surface of each of the depending resilient legs 37 of the attachment is provided near its outer or distal end with a pair of tapered or bevelled guide grooves 40 that commence at the outer edge of each leg and are aligned with and lead toward the respective holes or sockets 39. When an attachment embodying the invention is to be fitted onto the chain 23, the distal ends of the tapered or chamfered grooves 40 are positioned to align with and engage the protruding ends of the chain pins 34 as indicated in Fig. 7. This serves to align the attachment properly with the chain and to position the holes 39 in alignment with the pins 34 whereupon the attachment may be forced downward as shown in Fig. 7 in straddling relationship with the associated pin link 27.

As the attachment is forced down, the tapered grooves 40 serve as guide slots and also function as wedges or inclined surfaces in moving over the ends of the pins 34, thereby causing the resilient attachment legs 37 to deflect or spread outwardly as indicated in dot dash lines in Fig. 7. Further downward movement of the attachment then brings the holes 39 at the inner ends of the guide slots 40 in the legs 37 into register with the ends of the pins 34, whereupon the resilient connecting elements or legs 37 snap back to their original parallel relationship, with the chain abutments constituted by the protruding ends of the pins 34, securely retained within the holes 39. With the legs 37 again in parallel relationship, they engage the pin plates 33 at each side of the pin link to retain the loose side plate of the connecting link on the pins without the necessity of providing any other fastening means, as previously explained. Since the attachment legs engage the pin plates and the protruding pin ends in this manner, the attachment 24 is supported for articulating movement with the associated pin link 27 and moves with it as a unit.

When it is desired to remove an attachment 24 from its associated pin link, in order to disconnect the chain 23 or for any other purpose, it is merely necessary to pry one or the other of the resilient legs 37 outwardly to disengage the holes 39 from the protruding ends of the pins 34, whereupon the attachment may be lifted from the associated connecting link and removed from the chain. To assist in this operation, the inner surface of the distal end of each leg 37 is provided with a slot 41 between the guide grooves 40 that is adapted to receive an end of a prying tool such as a screw driver or the like. If desired, the chain may then be taken apart readily simply by removing the loose fitting side plate of the detachable connecting link and slipping an adjacent roller link sidewise to disengage it from the connecting link pin. After the necessary adjustments or repairs have been completed, the chain is reconnected and the connecting link side plate replaced, whereupon the attachment is forced down over the protruding ends of the chain pins as previously explained to deflect the resilient legs for re-engaging the holes or sockets 39 with the ends of the pins 34.

With the pin ends thus encompassed by the holes 39, the loosely fitted connecting link is retained in the chain and the attachment is rigidly secured in operating position on the chain in a manner to be proof against becoming dislodged under normal operating conditions. The engagement between the resilient connecting legs 37 and the pin ends constituting the chain abutments is such, however, that should the attachments meet with an obstruction, as might occur in case the conveyer becomes jammed, the excessive force encountered will deflect and pull the attachments from the chain, thereby relieving the strain and protecting the conveyer from more serious damage. In such instances, after the jam has been cleared, the attachments 24 may be replaced on the chain by snapping them over the pin links again, as previously explained.

Figure 8:
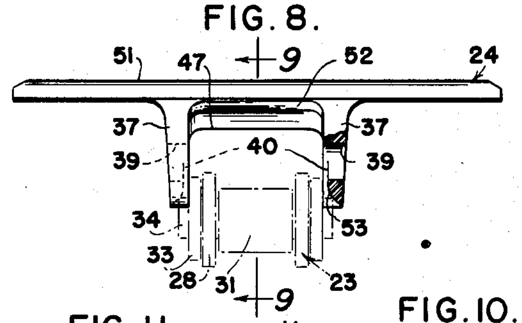
Fig. 8 is a view in end elevation, partly in section, of a modified top plate flight attachment illustrating a preferred form of the invention, and showing in broken lines a cooperating chain link in position to receive the attachment.
Figure 9:
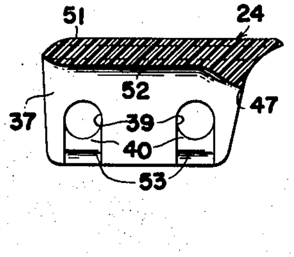
Fig. 9 is a view in longitudinal section through the preferred top plate attachment taken on the plane represented by the line 9—9 in Fig. 8.

In order that the degree of flexibility of the attachment securing legs or connecting elements 37 may be such as to prevent accidental detachment of the conveyer flight during normal operation while permitting removal thereof from the chain when required, a transverse reinforcing web or rib 42 is formed between the bases of the connecting elements 37, as indicated in Figs. 3, 4 and 5 of the drawing. The rib 42 reduces the flexibility of the midportion of the top plate 38, thereby stiffening the structure and increasing the force required to deflect the resilient legs 37 outwardly. Although the stiffening rib 42 is shown as being narrow and of curved or arcuate contour in cross section, as indicated in Fig. 4, the same effect can be achieved by thickening the top plate 38 uniformly from side to side in the region thereof between the resilient connecting elements, as illustrated in Figs. 8 and 9.

As previously mentioned, each top plate attachment is secured to one of the pin links, and the top plate 38 thereof is of sufficient length in direction longitudinally of the chain to cooperate with adjacent top plates in bridging the intervening roller links 26. As best shown in Fig. 4, the leading edge of each top plate 38 is bevelled or chamfered downwardly and forwardly in a manner to present a curved substantially arcuate convex surface. The trailing edge of each top plate 38 is likewise bevelled or chamfered rearwardly and upwardly in a manner to form a concave arcuate surface generally complementary to the convex surface of the leading edge. By this arrangement, the adjacent edges of juxtaposed top plates 38 in the conveyer are overlapped slightly to provide a load supporting surface that is substantially continuous, while at the same time the complementary curved overlapping surfaces provide for articulating movement of adjacent links without interference between plate edges.

By reason of the fact that the pin links 27, which carry adjacent flight attachments 24, are interconnected by roller links 26, it is possible to articulate the links in a manner to change the level of one top plate relative to an adjacent top plate by swinging movement of the interconnecting roller link 26. Thus, as appears in broken lines in Fig. 4, a trailing top plate may be depressed considerably below the level of the adjacent leading top plate. Should this type of misalignment occur to some extent during the operation of a conveyer, no particular harm would be done since any load or stationary object in contact with the upper surface of the conveyer could change from engagement with the elevated plate to the depressed plat without difficulty. On the other hand, should the trailing top plate become elevated above the leading top plate, difficulty would be encountered in the event that the conveyer should slide under a load or under a stationary object which might catch on the raised leading or overlapping edge of the trailing top plate.

To obviate this difficulty, provision is made for preventing the trailing roller link from pivoting upward above the axis of the chain or above a substantially horizontal position, as shown in Fig. 4. This is accomplished by providing a controlling or flexure limiting rib or web 47 disposed transversely on the lower surface of each top plate 38 near its trailing edge, as shown in Fig. 4. This rib or web 47 is in a position to be engaged by the upwardly moving side plates of the trailing roller link 26 in a manner to interfere with and prevent further upward tilting movement of the link beyond the substantially horizontal position there shown. This arrangement does not interfere with the normal articulation of the chain links, nor with the required back flexing or reverse bending of the conveyer. It does, however, limit in one direction the overlapping or misaligning movement made possible by the interposition of the roller links between the adjacent flight carrying pin links, and which otherwise might result in undesirable overlapping of adjacent top plates.

As illustrated by the lower or return run of the chain conveyer shown in Fig. 1, considerable bending in reverse direction or back flexing of the conveyer may occur in traveling over an idler, for example, such as a supporting roller 48. This is made possible by rotary interaction between the complementary arcuate surfaces of the respective leading and trailing edges of juxtaposed top plates 38 together with the fact that the overlapping tendency of these edges is restrained in one direction by the flexure limiting rib 47 as previously explained.

This restraint results in causing the pivoting action to take place about the leading pin of each flight-carrying pin link which turns in the adjacent end of the leading roller link. The pivoting action occurs at this point because of the fact that there is no restraint upon the pivoting movement of the flight-carrying pin link relative to the interconnected leading roller link, together with the fact that the leading roller link is restrained at its other end, as previously explained, from back flexing or tilting movement beyond a position of substantial alignment with its leading pin link. The roller link therefore does not pivot noticeably during back flexing and this serves as before mentioned to prevent undesired overlapping and interfering or interlocking action between the adjacent top plate edges. By reason of this arrangement whereby pivoting occurs about an axis close to the leading edge of the top plate, this plate top chain conveyer is enabled to bend in reverse direction or backflex about a smaller radius of curvature than previously known conveyers of the flat top type.

As previously mentioned, Figs. 8 and 9 show a preferred modification of the flat top cross flight attachment in which a top plate 51 is provided with a thickened mid-section 52 that takes the place of the stiffening rib 42 shown in Fig. 4. In this modification, the legs 37 depend from the ends of the thickened midportion 52, to which they are united by substantial fillets, and are tapered downwardly on their outer surfaces in such a manner that their upper ends are thicker and their lower ends thinner than in the attachment shown in Figs. 2 to 7. By this arrangement they are better enabled to withstand the forces imposed in deflecting them outwardly when applying the attachment to or removing it from the chain.

Furthermore, the pin guiding or positioning grooves 40 on the inner surfaces of the legs 37, instead of being tapered more or less uniformly, are provided near the outer or lead-in ends thereof with curved or arcuate surfaces 53. As best shown in Fig. 8, when the protruding ends of a pin 34 in the chain 23 (shown in broken lines) are brought into alignment with the guiding grooves 40, the rounded or arcuate lead-in surfaces 53 contact the edges of the pin ends. As the attachment is forced down over the pin ends, the arcuate surfaces 53 ride up on the edges of the pin ends and cause the legs 37 to deflect outwardly. Because of the arcuate shape of the surfaces 53, the initial deflection occurs quickly along steep inclines while further outward bending is completed along less steep inclines at a more gradual rate as the resistance increases, whereupon the pin ends then slide along the grooves 40 until they become aligned with and drop into the holes 39.

Figure 11:
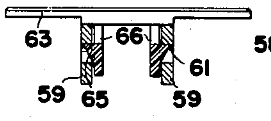
Fig. 11 is a view in transverse section through part of one of the modified attachments taken on the plane represented by the line 11—11 in Fig. 10.
Figure 10:
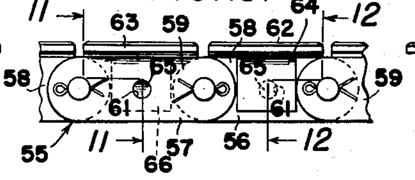
Fig. 10 is a view in side elevation on a reduced scale, of part of a conveyer embodying a modified form of the improved top plate attachment.
Figure 12:
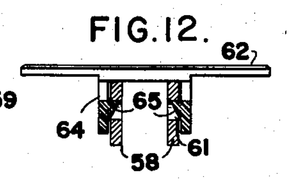
Fig. 12 is another view in transverse section showing a complementary attachment taken on the plane represented by the line 12—12 in Fig. 10.

In the modification of the invention shown in Figs. 10, 11 and 12, the conveyor is shown as being comprised of a chain 55 which is of the so called double pitch roller chain type carrying a series of modified cross flight attachments. As shown, the chain 55 is made up of alternately arranged roller links 56 and pin links 57, each of which is substantially twice as long as the roller links 26 and pin links 27 of the previously described chain 23, the chains being otherwise of substantially the same dimensions. The roller links 56 and pin links 57 comprise pairs of side plates 58 and 59 respectively. In this modification, instead of using the pin ends as attachment securing abutments, the chain abutment surfaces are provided by means of holes 61 extending through the middle of the side plates in the plane of the chain pins as shown in the drawing. In order to cooperate with the chain abutments thus provided, the cross flight attachments are of two types, roller link attachments 62 shown in Fig. 12 and pin link attachments 63 shown in Fig. 11.

In the case of the roller link attachments 62, depending parallel flexible legs 64 are arranged to straddle the roller link side plates 58 as in the previously described embodiments. In this instance, however, the legs 64 are provided on their inner surfaces with inwardly projecting generally cylindrical lugs 65 arranged to engage the holes 61 in the side plates 58. To facilitate mounting the attachment on the chain link, the inner faces of the lugs 65 are tapered downwardly and outwardly to act as inclined surfaces. Thus, when the attachment is applied to a roller link, the tapered surfaces 65 constitute wedges that cause the legs 64 to deflect outwardly as they are forced downward until the lugs 65 are brought into alignment with and enter the holes 61, whereupon the legs snap back to their parallel position with the lugs 65 securely retained within the holes 61. As in the previous embodiments, the attachment 62 can be removed by prying the legs outwardly to disengage the lugs from the holes.

In the pin link attachment 63 shown in Fig. 11, the attachment is provided with resilient legs 66 that are adapted to fit between and engage the inner surfaces of the side plates 59. In this instance, the legs 66 are provided on their outer surfaces with the tapered cylindrical lugs 65 that engage the holes 61 in the side plates from the inside. When applying an attachment of this type to the chain, the legs 66 are forced down between the side plates 59 with the tapered faces of the lugs 65 acting as wedges to deflect the legs 66 inwardly toward each other. As in the previously explained roller link attachment, when the lugs 65 are thus moved downward into alignment with the holes 61, they enter the holes and the legs 66 snap outward to their parallel position. Since the conveyer chain 55 is made up of alternately arranged roller links 56 and pin links 57, the corresponding flight attachments 62 and 63 are alternately arranged in a similar manner throughout the length of the conveyor.

Figure 14:
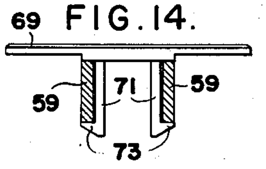
Fig. 14 is a view in transverse section through the conveyer chain and showing one of the modified conveyer attachments taken on the plane represented by the line 14—14 in Fig. 13.
Figure 13:
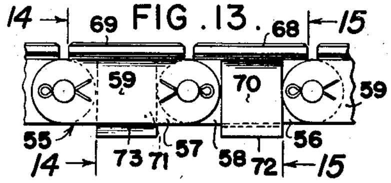
Fig. 13 is a view in side elevation similar to Fig. 10 but showing part of a conveyer embodying still another form of the top plate attachment.
Figure 15:
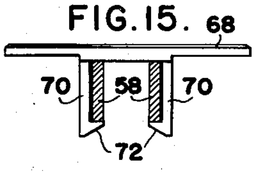
Fig. 15 is another view in transverse section showing a complementary attachment taken on the plane represented by the line 15—15 in Fig. 13.

A somewhat similar modified form of the conveyor is shown in Figs. 13, 14, and 15, in which the flight attachments are likewise carried by the double pitch roller chain 55. In this instance, however, the roller links 56 and the pin links 57 are made up of side plates 58 and 59 respectively of the usual type utilized in forming power transmitting chain of standard construction. Also, in this instance two types of flight attachments are utilized, a roller link attachment 68 and a pin link attachment 69. The roller link attachment 68 is provided with resilient legs 70 which straddle the link in engagement with the outer surfaces of the side plates 58 as in the other embodiments and as shown in Fig. 12, for example. The pin link attachment 69 is provided with resilient legs 71 that fit between the side plates 59 and engage their inner surfaces as in the previous embodiment shown in Fig. 11.

No special abutment elements are provided on the chain links in this instance for engaging with cooperating abutments on the resilient connecting elements of the attachments. Instead, the resilient legs 70 of the attachment 68 are provided at their lower ends with inwardly projecting lugs 72 which fit beneath and engage the lower edges of the side plates 58 thereby constituting the cooperating abutments which provide for engaging the attachment with the chain link. The inner surfaces of the lugs 72 are tapered downwardly and outwardly to form wedging surfaces that operate to spread the legs 70 when they are forced downward over the side plates 58. As in the previous modification, when the lugs 72 are pressed down over the chain link 56 into register with the abutments constituted by the lower edges of the side plates 58, the legs 70 snap inward to their parallel positions, thereby locking the attachment on the chain link.

In the case of the pin link attachment 69, the resilient legs 71 are formed with outwardly projecting abutments 73 which likewise engage the lower edges of the side plates 59. As shown, the lugs 73 are tapered downwardly and inwardly on their lower outer surfaces, whereby the legs 71 are deflected inwardly toward each other when they are forced between the side plates 59. When the lugs 73 register with the lower edges of the side plates 59, they slide over the edges as the legs 71 snap outwardly to their parallel positions to lock the attachment 69 on the pin link 57. As in the previous modification, the attachments 68 and 69 are arranged alternately on the chain 55. Since no special abutments need be provided on the chain, the attachments 68 and 69 may be applied to a standard power transmitting chain, such as of the double pitch roller type, without the necessity of modifying the chain in any way to receive them.

Figures 16, 17:
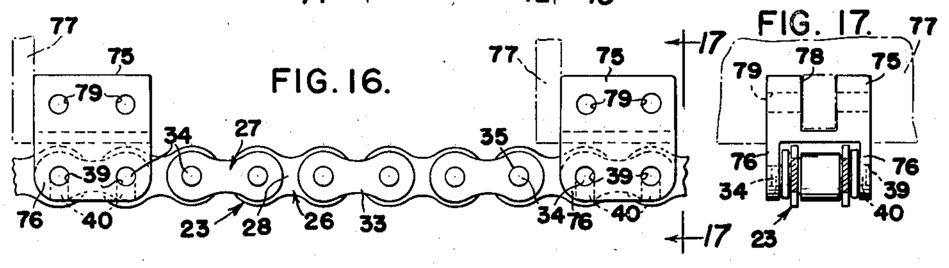
Fig. 16 is a view in side elevation showing a conveyer having attachments of modified form and mounted in spaced relationship on a cooperating chain.
Fig. 17 is a view in transverse section through the modified conveyer taken on the plane represented by the line 17—17 in Fig. 16.

In the previously described modifications of the invention, the flight attachments have all been of the top plate type mounted on the base chain in juxtaposed relationship to present a substantially continuous flat load receiving surface. It is to be understood, however, that the invention is not limited to flight attachments of any particular type, nor do the several attachments need to be applied in any special relationship on the chain. In the modification of the invention shown in Figs. 16 and 17, the base chain 23 carries a series of attachments 75 that are of the pusher type adapted to engage and push along material being conveyed by the conveyer. As best shown in Fig. 17, the attachment 75 is provided with spaced depending flexible legs 76 that may be generally similar to the legs 37 or to any of the forms of resilient connecting elements shown with the various other modifications of the invention. In this instance, the resilient legs 76 are snapped over the protruding ends of the chain pins 34 to retain the attachment 75 on a pin link 27 of the chain 23 in a manner previously explained.

As shown in Fig. 16, the pusher attachments 75 are mounted in spaced relationship on the chain 23 at any desired distance apart suitable to accommodate the particular material or objects being pushed along by the conveyer. Since the attachments are applied to only a few of the pin links of the chain, it is preferable that the pins 34 be pressed into the holes 35 in both of the pin plates 33 instead of being constituted as loosely fitted connecting links such as used in the chain 23 shown in Fig. 4. As previously explained, the consecutively arranged flight attachments, serve to retain all of the connecting links in the chain, thereby obviating the necessity of providing clips or cotter pins for securing the pin plates on the chain. On the other hand, this link retaining function is realized by the spaced pusher attachments 75 only with regard to those particular links of the chain over which they are fitted.

As appears in the drawing, both end faces of the attachment 75 constitute straight flat transverse pushing surfaces either of which may be used to push material. Thus, the pusher attachments 75 are equally effective to push material in either direction, and therefore operate regardless of the direction in which the chain 23 may happen to be operating.

The flight attachment 75 may be used directly as a pusher or, if a larger pusher attachment is required, an additional element, such as transverse pusher block 77 shown in broken lines, may be secured to and augment the pusher attachment 75. For this purpose, the pusher attachment 75 may be provided, as shown in Fig. 17, with a longitudinal slot 78 and transverse holes 79 or other suitable openings arranged to be utilized in securing the auxiliary pusher block 77 or the like to the attachment 75.

Figures 18, 19:
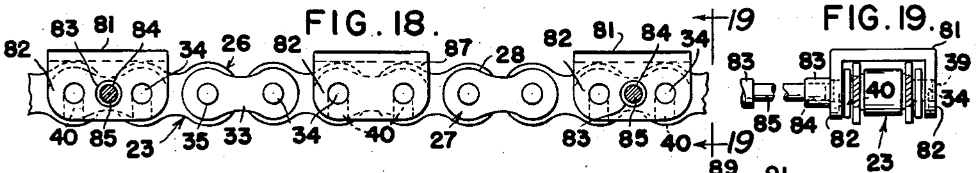
Fig. 18 is a view in side elevation similar to Fig. 16 but showing a conveyer chain having spaced thereon attachments adapted to receive one end of a material conveying cross piece or rod, the other end of which is carried by a complementary attachment on a similar parallel chain.
Fig. 19 is a fragmentary view partly in transverse section, taken on the plane represented by the line 19—19 in Fig. 18 and showing in addition part of a complementary attachment supporting the opposite end of a cross rod.

Another form in which attachments embodying the invention may be utilized is illustrated in Figs. 18 and 19. In this modification, the chain 23 is provided at spaced intervals with cross rod attachments 81 that include flexible legs 82 which snap over the chain pin links in the manner previously explained. In this attachment one of the retaining legs 82 is provided with a lug 83 extending at one side in the plane of the chain pins and presenting a socket or bore 84. As best shown in Fig. 19, the bore or hole 84 receives one end of a cross rod 85, the other end of which is received in the bore 84 of the lug 83 on a similar complementary attachment 81 carried by a similar second chain operating in spaced parallel relationship with the chain 23 shown in the drawing. By this arrangement the cross rods 85, which may be of length suitable to the circumstances, may be supported at opposite ends by a pair of parallelly operating chains equipped with the attachments 81 to constitute a conveyer of desired width.

Although the attachments 81 are each shown as provided with only one lug 83, each attachment may, if desired, be provided with two lugs, preferably aligned with the two chain pins 34 in order that the cross rods 85 may be positioned on the axes of the chain pins. Furthermore, although the cross rods 85 are shown as being circular in cross section, it is to be understood that they may take any other suitable form, such as being of rectangular shape for example, to constitute a slat conveyer. In this event, the lugs and sockets on the attachments would be shaped in a manner suitable to receive the ends of the rectangular cross slats.

From the examples shown in Figs. 16 to 19, it is apparent that attachments embodying the present invention, whereby conveyer flights are removably secured to a chain by means of resilient connecting elements, may be made in any of a great variety of forms and sizes in accordance with the requirements of the conveying operations to be accomplished. In conveyers such as shown in Figs. 16 and 18, wherein the attachments are in spaced relationship on the chain, the pin links are preferably of the type in which the side plates are press fitted on the pins as previously mentioned. If, on the other hand, it is desired to use connecting links with one loosely fitted side plate, the links may be retained in the chain by means of a special securing attachment or clip 87 shown in Fig. 18 between the attachments 81. The clip 87 is essentially a U-shaped member generally similar to the attachment 81 but devoid of projecting lugs or flights. When a clip 87 is fitted over a connecting pin link in the manner of the attachment 81 for example, it serves to retain the loosely fitted side plate on the ends of the pins thereby taking the place of such side plate retension means as spring clips and cotters heretofore used for that purpose.

Figure 20:
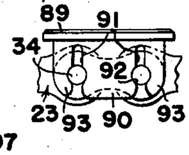
Fig. 20 is a view in side elevation of a fragment of a conveyer carrying a top plate attachment constituting still another modification of the invention.

Fig. 20 shows a different modification of the invention wherein an attachment 89, which may be of the top plate type or of any other flight construction, is provided with depending legs 90 that are not arranged to be flexed sideways, as in the previously described embodiments, in fitting the attachment over the pin links. Instead, the legs 90 are each provided with two slots 91 extending transversely therein as shown in Fig. 20, in the vertical planes of the chain pin axes. The slots 91 are provided with enlargements 92 adapted to fit around and grasp the ends of the pins 34 when the attachment is mounted on the chain. In placing the attachment 89 on the chain 23, the lower ends of the slots 91 are placed over the respective chain pins 34. The attachment is then pressed downward, thereby causing the pins 34 to enter and open the slots 91 through deflection of partially separated end portions 93 of the legs 90. When the enlargements 92 are brought into alignment with the pins 34, the slots 91 close and the pins are grasped by the flexible end portions 93 to retain the attachment 89 on the chain.

Figure 21:
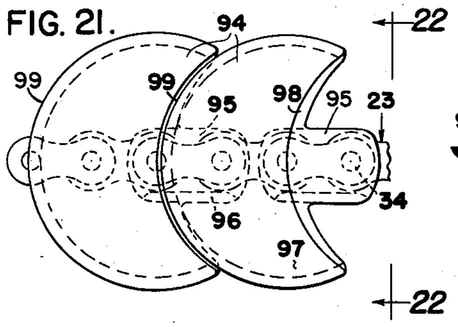
Fig. 21 is a top plan view of a fragment of a crescent top conveyer of the articulating or carousel type adapted to flex in the plane of its carrying surface; and, Fig. 22 is a view in transverse section through the crescent top conveyer chain taken on the plane represented by the line 22—22 in Fig. 21.
Figure 22:
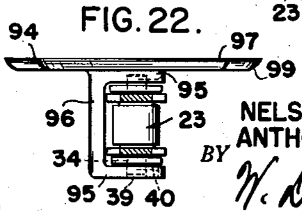

In Figs. 21 and 22 another form of flat top attachment is shown wherein the operating or load carrying flight is secured to one of the chain straddling legs as in the attachment 81 shown in Figs. 18 and 19. In this instance, however, the chain 23 is disposed in a position to operate on its side, that is with the chain pins 34 positioned vertically whereby the chain may be caused to articulate in a horizontal plane. In this case the flat top of the conveyer is provided by a series of crescent top chain attachments 94. As shown in Fig. 21, adjacent crescent top attachments 94 overlap each other slightly as do the top plates of the attachments shown in Fig. 2, for example. However, since the chain 23 shown in Figs. 21 and 22 is positioned at ninety degrees to the chain in Fig. 2, flexing of the conveyer occurs in the plane of its flap top. The necessary pivoting movement between adjacent crescent top attachments 94 is accommodated by reason of the arcuate or crescent shape of the load supporting tops thereof which permit articulation in the horizontal plane of the top, whereby the conveyer may operate around corners in the manner of a carousel.

As appears in Fig. 22, the crescent top attachment 94 may be considered as constituted by a pair of chain straddling legs 95 generally similar to the legs 82 of Fig. 19 and connected by a bridging member 96 to form a U-shaped unit similar to the clip 87 shown in Fig. 18. The attachment is completed by a crescent shaped top plate 97 that is secured to or constitutes an integral part of the uppermost leg 95, the plate being fastened to the leg 95 near one end thereof as shown in Fig. 21 with its concave edge 98 in substantial alignment with the chain pin at the end of the attachment. When the conveyer deflects sidewise, in turning a corner for example, the convex edge 99 of the top plate 97, which lies on an arc having the chain pin as its center, pivots about the pin in sliding engagement with the complementary concave edge 98 of the adjacent crescent top plate 97. By this arrangement there is provided a flat top conveyer adapted to articulate in the plane of its top surface and made up of a base chain of conventional construction that carries the removable attachment flights which are secured to it by flexible connecting elements in accordance with the invention.

From the foregoing description of exemplary flight attachments illustrating the present invention, and the explanation of the manner of mounting and using these novel attachments, it will be apparent that new and improved arrangements have been provided by this invention for detachably securing flight attachments to chains to constitute conveyers or the like. This improvement is accomplished by providing each flight attachment with one or more resilient connecting elements that carry abutments which are engaged by resilient action with complementary abutments on a chain to secure the attachments thereon. By this arrangement, attachments may be secured to a chain quickly and easily in a manner to be retained thereon securely, while also being readily detachable by deflecting the resilient element to disengage the interlocked abutments.

Although various specific examples of particular flight attachments have been set forth in detail by way of a full disclosure of useful embodiments of the invention, it is to be understood that other arrangements of the attachments and their connecting elements may be substituted by those familiar with the conveyer art without departing from the spirit and scope of the invention as defined by the subjoined claims.

The various features of the invention having now been fully set forth and explained, we claim as our invention:

1. In a chain conveyer of the flat top type, the combination with a roller chain of conventional construction including a series of roller links interconnected by interspersed pin links joined thereto at their ends by pivot pins presenting protruding ends, of a plurality of flat top cross flight attachments each formed of molded plastic material and each comprising a transverse body member presenting a flat load-carrying top surface and having depending therefrom spaced parallel resilient legs adapted to straddle said chain, each of said legs being provided with a pair of spaced sockets adapted to receive said protruding ends of adjacent pivot pins in the respective ends of one of said pin links, said flat top body member being of sufficient length to abut at its edges the adjacent edges of adjacent attachments thereby forming a substantially continuous load-carrying surface upon said conveyor, the arrangement being such that said molded attachments may be removed readily from said chain by deflecting said resilient legs outwardly to disengage said sockets from said protruding pin ends and likewise may be replaced readily by deflecting said resilient legs outwardly while pressing them over said protruding pin ends to bring said sockets into register with said pin ends for securing said attachments in operating position on said chain, said molded plastic attachments each having a re-enforcing cross member formed integrally therewith beneath and depending from said body member at its trailing edge in a position to join said spaced legs to stiffen them for gripping said chain, said depending cross member also serving to contact the trailing roller link of said chain for limiting flexure thereof in one direction beyond longitudinal alignment with said chain in a manner to obviate interlocking of adjacent edges of adjacent attachments.

2. In an attachment for an articulated chain presenting protruding abutments, an attachment body disposed to be carried by said chain and having depending resilient connecting elements adapted to engage with said chain abutments to secure said attachment thereto, said resilient connecting elements presenting chamfered guide grooves on the surfaces of their distal ends for engaging said protruding chain abutments in a manner to cause deflection of said resilient elements when said chamfered grooves are forced over said abutments and said elements furthermore being provided on their surfaces inwardly from their chamfered distal ends with sockets terminating said guide grooves and adapted to receive and fit over said protruding abutments when guided into alignment therewith as said resilient elements are forced over them, the arrangement being such that said attachment may be removed readily by deflecting said resilient elements to disengage said sockets therein from said protruding chain abutments.

3. In a conveyer or the like, a movable member presenting abutments protruding from opposite sides thereof, and a conveyer flight provided with a pair of spaced resilient legs adapted to straddle said movable member and presenting on the inner surfaces of the distal ends thereof tapered guide grooves terminating in sockets adapted to receive said protruding abutments, the arrangement being such that said resilient legs may be deflected outward by action of said tapered guide grooves in sliding over said abutments to engage said sockets with said abutments for retaining said flight on said movable member, whereby said flight may be removed readily by deflecting said legs to disengage said sockets from said abutments.

4. An attachment for a conventional roller chain having roller links connected to alternately arranged pin links by pivot pins presenting protruding ends, that comprises an attachment body portion having extending therefrom a pair of parallel resilient legs spaced to straddle one of said chain pin links, said resilient legs each presenting on its inner surface two tapered guide grooves leading from the distal end thereof respectively to sockets spaced to receive said protruding ends of said pins at the respective ends of said pin link, the arrangement being such that said resilient legs may be deflected by operation of said tapered guide grooves in engaging said sockets with said protruding chain pin ends and likewise to disengage them in removing said attachment from said chain.

5. In a chain conveyer of the flat top type, the combination with a roller chain of conventional construction including a series of roller links interconnected by interspersed pin links that are joined thereto by pivot pins presenting protruding ends, of a plurality of flat top cross flight attachments each formed of molded plastic material and each comprising a transverse body member presenting a flat load-carrying top and having depending therefrom spaced parallel resilient legs adapted to straddle one of said pin links of said chain, each of said legs being provided on its inner surface at its distal end with two spaced tapered guide grooves leading respectively to sockets adapted to receive said protruding ends of the two adjacent pivot pins in the respective ends of one of said pin links, said flat top body member being of sufficient length to abut at its edges the adjacent edges of adjacent attachments thereby forming a substantially continuous load-carrying surface upon said conveyer, the arrangement being such that said molded attachments may be removed readily from said chain by deflecting said resilient legs outwardly to disengage said sockets from said protruding pin ends and likewise may be replaced readily by deflecting said resilient legs outwardly through wedging action of said tapered guide grooves while pressing them over said protruding pin ends to bring said sockets into register with said pin ends for securing said attachments in operating position on said chain, said molded plastic attachments each having a re-enforcing cross member formed integrally with and depending from the lower side of said body member at its trailing edge in a position to join said spaced legs to stiffen them for gripping said chain, said depending cross-member also serving to contact the trailing roller link of said chain for limiting flexure thereof in a manner to obviate interlocking of abutting edges of adjacent attachment.

6. In a chain conveyer for transporting articles or like material, the combination with a power-transmitting chain of the type formed by articulated links connected by pivot pins and in which said pins project at both their ends on opposite sides respectively of said chain links near their respective ends, of an integrally formed conveyer flight of molded plastic material, said flight comprising a load carrying body having projecting therefrom resilient legs adapted to straddle one of said chain links, said legs presenting spaced openings near their distal ends adapted to receive the respective projecting ends of said chain pins at the respective ends of said chain link when in operating position on said chain link, and presenting tapered grooves on their inner surfaces leading from their distal ends to said respective pin end receiving openings for engaging said pin ends to guide them into said openings while serving as tapered wedging surfaces to deflect said resilient legs as they are forced over said pin ends, said flight being retained by the engagement of said projecting chain pin ends in said pin receiving openings to move and articulate with said chain link yet being removable readily therefrom by deflecting said resilient plastic legs to disengage said openings from said chain pin ends.

7. In a chain conveyer of the flat top type, the combination with a roller chain of conventional construction including a series of roller links interconnected by interspersed pin links joined thereto by pivot pins presenting protruding ends, of a plurality of flat top cross flight attachments formed of molded plastic material and each comprising a transverse body member presenting a flat load-carrying top having depending therefrom spaced parallel resilient legs adapted to straddle said chain, each of said legs being provided on the inner surface of its distal end with tapered guide grooves leading to spaced sockets adapted to receive said protruding ends of said pivot pins in the respective ends of one of said pin links, and said flat top body member being of sufficient length to abut at its edges the adjacent edges of adjacent attachments thereby forming a substantially continuous load-carrying surface upon said conveyer, the arrangement being such that said molded attachments may be removed readily from said chain by deflecting said resilient legs outwardly to disengage said sockets from said protruding pin ends and likewise may be replaced readily by deflecting said resilient legs outwardly through wedging action of said tapered guide grooves while pressing them over said protruding pin ends to bring said sockets into register with said pin ends for securing said attachments in operating position on said chain.

8. In a flat top chain conveyer, the combination with a roller chain adapted for articulation in either direction in a vertical plane and comprised of a plurality of roller links interconnected by interspersed pin links, of a plurality of flat top plate cross flight members secured to said pin links only and arranged in juxtaposed relationship, the leading edge of each flight plate being chamfered downward and forward while the trailing edge thereof is chamfered upward and rearward to provide for overlapping of adjacent flight edges for presenting a substantially flat horizontal supporting surface to receive articles being conveyed thereon, each of said cross flight plates being provided beneath its flat top near its trailing edge with a flexure limiting rib depending therefrom into interfering relationship with the roller link that trails the cross flight supporting pin link of said chain in a manner to prevent reverse flexure therebetween beyond substantial horizontal alignment of said links, whereby overlapping of said chamfered leading edge of any flight above said chamfered trailing edge of the preceding flight is obviated, reverse flexure of said chain being permitted only between each flight supporting pin link and the adjacent leading roller link.

References Cited in the file of this patent

UNITED STATES PATENTS

| | | |
|---|---|---|
| 1,136,578 | Ayres | Apr. 20, 1915 |
| 1,174,965 | Brown | Mar. 14, 1916 |
| 1,740,607 | Leary | Dec. 24, 1929 |
| 1,769,336 | Detaint | July 1, 1930 |
| 2,333,926 | Hapman | Nov. 9, 1943 |
| 2,395,761 | Reed | Feb. 26, 1946 |
| 2,792,928 | Holz | May 21, 1957 |

FOREIGN PATENTS

| | | |
|---|---|---|
| 498,488 | Italy | Sept. 30, 1954 |